UNITED STATES PATENT OFFICE.

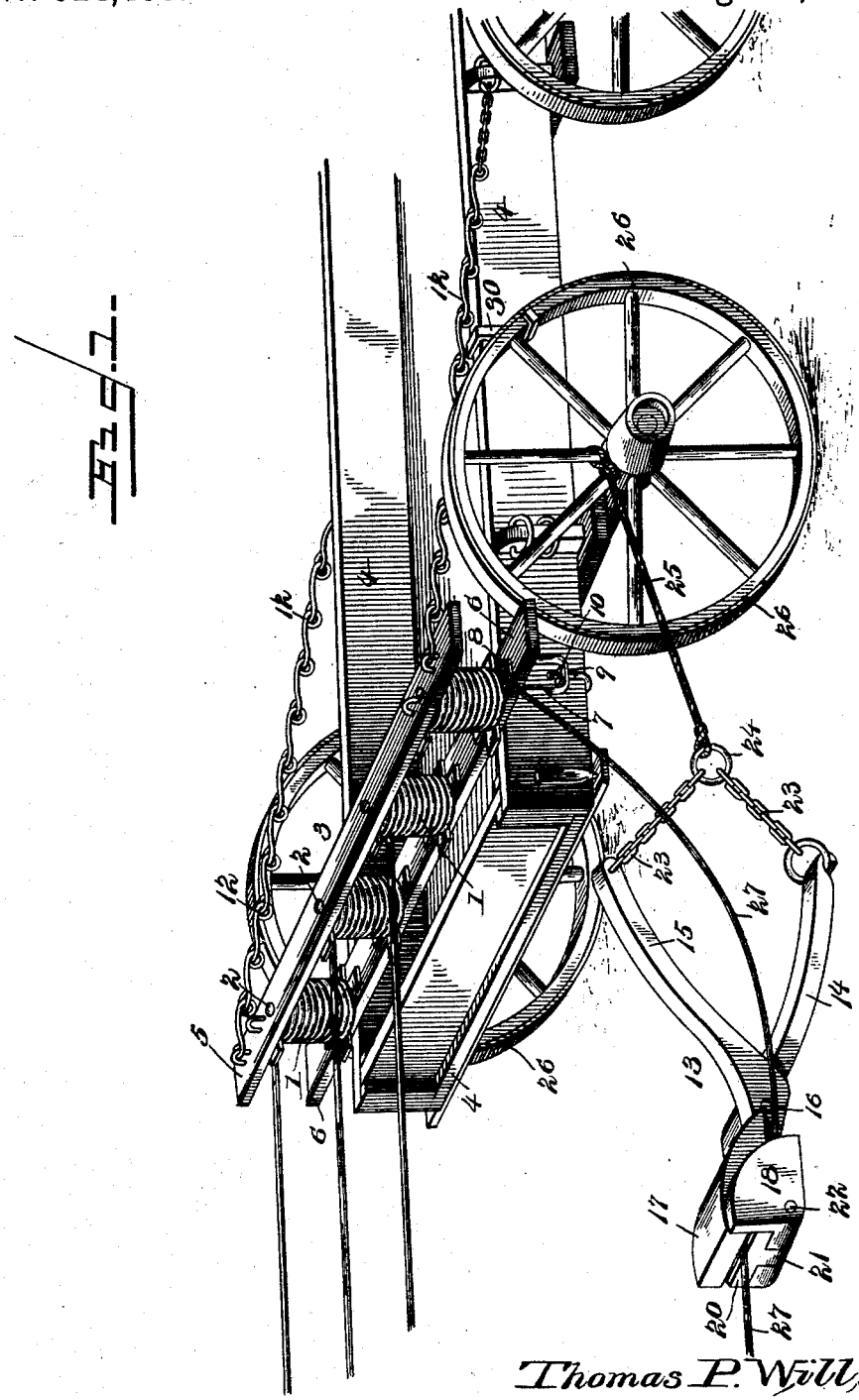

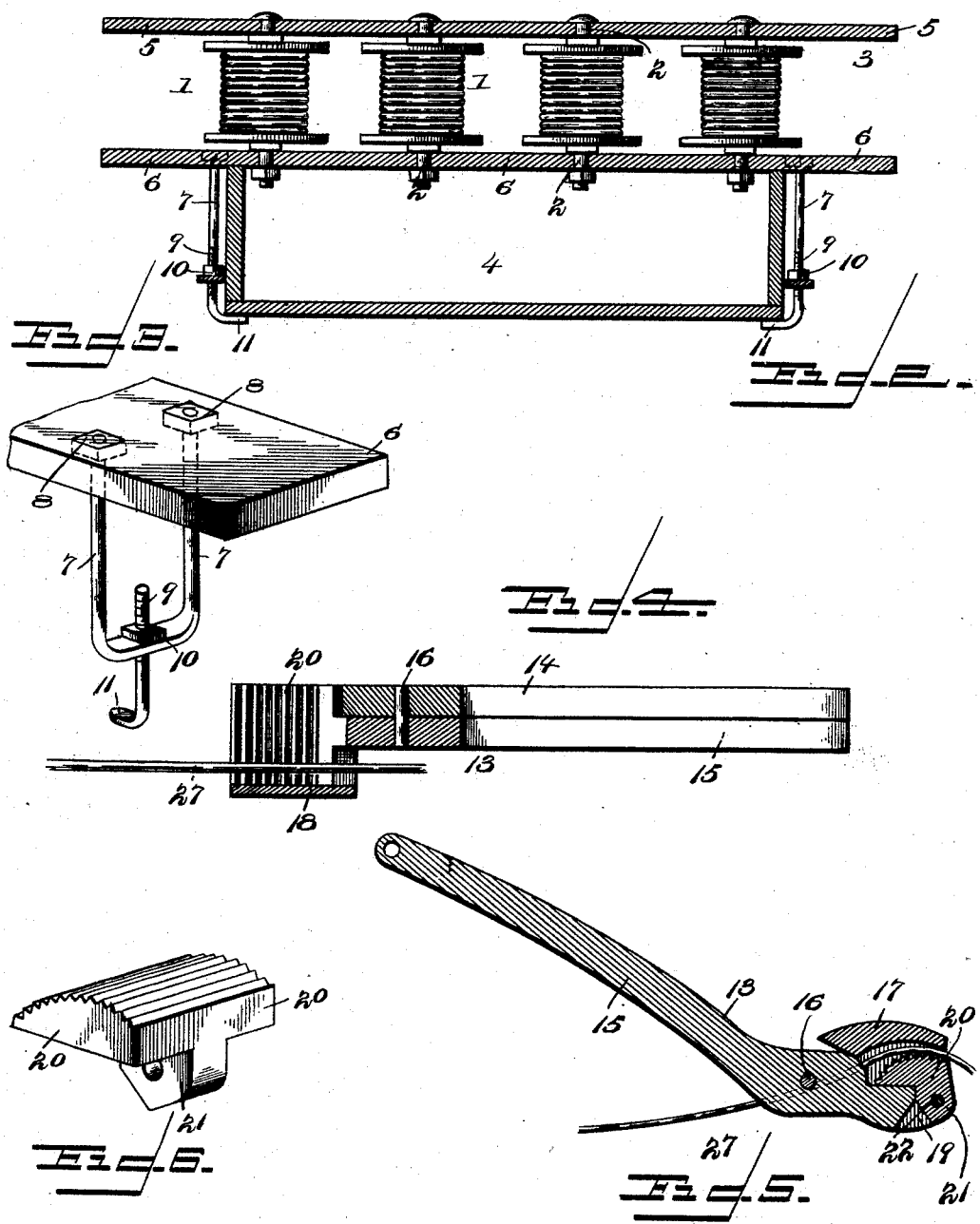

THOMAS P. WILLIAMS, OF ABILENE, TEXAS.

WIRE-STRETCHING SPOOL-CARRIER.

SPECIFICATION forming part of Letters Patent No. 524,453, dated August 14, 1894.

Application filed October 31, 1893. Serial No. 489,660. (No model.)

*To all whom it may concern:*

Be it known that I, THOMAS P. WILLIAMS, a citizen of the United States, residing at Abilene, in the county of Taylor and State of Texas, have invented a new and useful Wire-Stretching Spool-Carrier, of which the following is a specification.

The invention relates to improvements in wire stretchers and spool carriers.

The object of the present invention is to provide a wire stretcher and spool carrier adapted to be readily mounted on and connected with a vehicle, and capable of enabling fence wires to be readily supplied in series and to be stretched at the desired tension.

The invention consists in the construction and novel combination and arrangement of parts hereinafter fully described, illustrated in the accompanying drawings and pointed out in the claims hereto appended.

In the drawings—Figure 1 is a perspective view of a reel carrier and wire stretcher embodying the invention. Fig. 2 is a transverse sectional view showing the spool carrier. Fig. 3 is a detail perspective view of one of the attachment yokes. Fig. 4 is a sectional view of the clamp or grip. Fig. 5 is a detail sectional view of the jaws of the same. Fig. 6 is a detail perspective view of the pivoted jaw of the grip or clamp.

Like numerals of reference indicate corresponding parts in all the figures of the drawings.

1 designates a series of spools of wire rotatively mounted on vertical pins 2 of a frame 3, which is clamped upon a wagon body 4 adjacent to the rear end thereof, whereby a series of fence wires may be simultaneously distributed. The transverse frame 3 consists of upper and lower boards or pieces 5 and 6, which are arranged parallel with each other and are connected by the bolts 2, having heads at their tops and provided with nuts at their lower ends. The bottom piece 6 of the frame is provided at each end with a depending yoke 7, which has the upper ends of its sides threaded and secured to the bottom piece 6 by nuts 8 which are countersunk in the bottom piece. The yoke is provided at its bottom with an opening in which is arranged a screw 9, which is secured to the yoke by a nut 10 arranged on the upper face of the bottom thereof. The lower end of the screw is provided with an inwardly extending lug 11, which engages under the bottom of the wagon body or bed and is forced into such engagement by the nut 10 to clamp the bottom of the frame firmly on the wagon bed or bottom. The top 5 of the transverse frame is provided with eyes and is connected with the front standards of the vehicle by chains 12. As the wagon is advanced the spools rotate on the pivot pins to unwind the wire from them.

The wires are stretched singly by a grip or clamp 13, composed of pivoted members 14 and 15 operating similarly to tongs and having diverging rearwardly extending portions. The member 14 is provided in advance of the pivot 16 with a curved jaw 17; and the other member is provided with a side flange 18 and has a slot or bifurcation 19, in which is pivotally mounted a segmental jaw 20. The jaw 20 has a roughened or serrated curved engaging face, which is disposed opposite the jaw 17, and it is provided with a depending lug 21, which is secured to the member 15 in the bifurcation thereof by a pivot pin 22. The rearwardly diverging portions of the members have attached to them a chain 23, and are provided with eyes or hooks to receive the same; the chain has a centrally disposed enlarged link or ring 24, to which is attached a rope or cable 25; and the latter extends to one of the spokes of one of the hind wheels 26 of the vehicle, whereby when the wheel 26 is rotated the rope or cable will be wound around the hub and will draw the diverging portion of the members of the clamp together to force the jaws of the clamp in engagement with a fence wire 27 to hold the latter securely. A continued rotation of the wheel 26 stretches the wire to the desired tension. The rear axle is designed to be elevated by a wagon jack or other suitable means to enable the wheels 26 to rotate freely.

By pivotally mounting the segmental jaw of the member 15 of the clamp, the wire tends, while being stretched to swing the pivoted jaw outward, thereby forcing the wire more closely in contact with the curved jaw of the other member; and it will be apparent that the greater the strain the more securely a wire is held.

The flange 18 is offset from the member 15, with which it is formed integral to enable the wire to be arranged at the side of the member 15 and to prevent the wire from becoming disengaged from the jaws of the clamp.

The wheel used for stretching a wire is held against retrograde rotation by a double hook 30, which engages the wheel and the upper edge of the wagon body.

It will be readily apparent that the construction herein shown and described enables the desired number of wires for a fence to be paid out simultaneously instead of singly; and that the fence wires may be readily stretched to the desired tension.

Changes in the form, proportion, and the minor details of construction may be resorted to without departing from the principle or sacrificing any of the advantages of this invention.

What I claim is—

1. In a wire stretcher and spool carrier, the combination of detachable horizontally disposed parallel top and bottom pieces, removable pins connecting the top and bottom pieces and adapted to receive spools of wire and to afford spindles for the same, and clamps depending from the bottom piece for securing the frame to a wagon body, substantially as described.

2. In a wire stretcher and spool carrier, the combination of a frame provided with removable pins adapted to receive spools of wire, yokes depending from the frame, and screws depending from the yokes and having their upper ends threaded and provided with nuts and loosely mounted in the yokes and provided at their lower ends with lugs adapted to engage the bottom of a wagon body, substantially as described.

3. In a wire stretcher, a clamp comprising pivoted members having diverging portions at one side of the pivot, one of the members being provided at the other side of the pivot with a curved jaw and the other member having a side flange offset and arranged opposite the curved jaw, and a pivotally mounted segmental jaw mounted on the member having the flange and having a roughened engaging surface arranged opposite and adapted to cooperate with the curved jaw, substantially as described.

4. In a wire stretcher, the combination of the pivoted members provided with diverging portions at one side of the pivot and provided at the opposite side with a curved jaw and an offset side flange, a pivotally mounted segmental jaw secured to one of the members and arranged opposite the curved jaw, a chain connecting the diverging portions of the members, and a rope or cable connected to the chain and adapted to be wound around the hub of the wheel, substantially as and for the purpose described.

5. In a wire stretcher and spool carrier, the combination of a frame composed of detachable horizontally disposed parallel top and bottom pieces and removable spool holding pins connecting the same, clamps depending from the bottom of the frame for securing the latter to a wagon body, and a wire stretcher adapted to receive the wires of the spools and arranged at one side of the wagon, and a rope connected with the clamp and secured to the adjacent wheel and arranged to be wound on the hub thereof, substantially as described.

In testimony that I claim the foregoing as my own I have hereto affixed my signature in the presence of two witnesses.

THOMAS P. WILLIAMS.

Witnesses:
D. G. HILL,
C. M. BRADSHAW.